US008582836B2

(12) United States Patent
Niskanen et al.

(10) Patent No.: US 8,582,836 B2
(45) Date of Patent: Nov. 12, 2013

(54) FACE RECOGNITION IN DIGITAL IMAGES BY APPLYING A SELECTED SET OF COEFFICIENTS FROM A DECORRELATED LOCAL BINARY PATTERN MATRIX

(75) Inventors: Matti Niskanen, Oulu (FI); Markus Turtinen, Ii (FI); Jari Hannuksela, Ii (FI)

(73) Assignee: Visidon Oy, Oulu (FI)

( * ) Notice: Subject to any disclaimer, the term of this patent is extended or adjusted under 35 U.S.C. 154(b) by 0 days.

(21) Appl. No.: 13/500,035

(22) PCT Filed: Oct. 4, 2010

(86) PCT No.: PCT/FI2010/050765
§ 371 (c)(1),
(2), (4) Date: May 3, 2012

(87) PCT Pub. No.: WO2011/042601
PCT Pub. Date: Apr. 14, 2011

(65) Prior Publication Data
US 2012/0213422 A1      Aug. 23, 2012

(30) Foreign Application Priority Data
Oct. 9, 2009   (FI) ..................................... 20096046

(51) Int. Cl.
*G06K 9/00*       (2006.01)
(52) U.S. Cl.
USPC ......................................................... 382/118
(58) Field of Classification Search
USPC ......................................................... 382/118
See application file for complete search history.

(56) References Cited

U.S. PATENT DOCUMENTS

| 6,542,545 | B1 * | 4/2003 | Vetro et al. ............... 375/240.08 |
| 8,103,058 | B2 * | 1/2012 | Niskanen et al. ............. 382/103 |
| 2003/0165260 | A1 | 9/2003 | Kim et al. |
| 2007/0172099 | A1 | 7/2007 | Park et al. |
| 2008/0166026 | A1 | 7/2008 | Huang et al. |
| 2009/0252413 | A1 * | 10/2009 | Hua et al. ...................... 382/170 |

OTHER PUBLICATIONS

Ahonen et al., Face Description with Local Binary Patterns: Application to Face Recognition, IEEE Transactions on Pattern Analysis and Machine Intelligence. vol. 28, No. 12, Dec. 2006, pp. 2037-2041.*
Chen et al., Face Recognition Using Modular Independent Component Analysis Directly Based on Image Matrix, Fifth International Conference on Natural Computation, IEEE, 2009, pp. 559-562.*
Ojala et al., Multiresolution Gray-Scale and Rotation Invariant Texture Classification with Local Binary Patterns, IEEE Transactions on Pattern Analysis and Machine Intelligence, vol. 24, No. 7, Jul. 2002, pp. 971-987.*
Ahonen et al., Recognition of Blurred Faces Using Local Phase Quantization, IEEE, Pattern Recognition, 19th International Conference on, 2008, pp. 1-4.*

(Continued)

*Primary Examiner* — David Zarka
(74) *Attorney, Agent, or Firm* — Hoffmann & Baron, LLP (57) ABSTRACT

A solution for face recognition. The solution includes detecting a face from a digital image constructed of multiple pixels, selecting a neighbor-hood for a pixel under observation, obtaining a combination of pixel values weighted with at least one set of coefficients, and determining information on face similarity between the observed face and at least one face.

9 Claims, 3 Drawing Sheets

(56) References Cited

OTHER PUBLICATIONS

Jabid et al., Facial Expression Recognition Using Local Directional Pattern (LDP), Proceedings of 2010 IEEE 17th International Conference on Image Processing, Sep. 26, 2010, pp. 1605-1608.*

Ahonen et al., "Recognition of Blurred Faces using Local Phase Quantization", 19th International Conference on Pattern Recognition, Abstract, Chapter 2.1, pp. 1-4, (2008).

Cao et al., "Facial Expression Recognition Based on LBP-EHMM", Congress on Image and Signal Processing, CISP, Abstract, Chapter 4, pp. 371-375 (2008).

Chen et al., "Face Recognition Using Modular Independent Component Analysis Directly Based on Image Matrix", In Proc. Fifth International Conference on Natural Computation, pp. 559-562. (2009).

Deniz et al., "Face Recognition Using Independent Component Analysis and Support Vector Machines", Pattern Recognition Letters, vol. 24, Nr. 13, p. 2153-2157 (2003).

Hadid, A., "The Local Binary Pattern Approach and its Applications to Face Analysis", First Workshops on Image Processing Theory, Tools and Applications, pp. 1-9, (2008).

Heusch et al., "Local Binary Patterns as an Image Preprocessing for Face Authentication", 7th International Conference on Automatic Face and Gesture Recognition, Abstract, Chapter 2.2, pp. 1-6 (2006).

Kim, et al., "Independent Component Analysis in a Local Facial Residue Space for Face Recognition", Pattern Recognition, vol. 37, Nr. 9, pp. 1-13 (2004).

Nguyen et al., "Local Gabor Binary Pattern Whitened PCA: A Novel Approach for Face Recognition from Single Image Per Person", Advances in Biometrics, vol. 5558/2009, abstract, chapter 2, pp. 269-278 (2009).

Yang, et al., "Kernel ICA: An Alternative Formulation and its Application to Face Recognition", Pattern Recognition, vol. 38, Nr. 10, pp. 1784-1787 (2005).

Zhang et al., "Local Derivative Pattern Versus Local Binary Pattern: Face Recognition With High-Order Local Pattern Descriptor, "IEEE Transactions on Image Processing, vol. 18, Nr. 2, pp. 533-544 (2010).

Zhang et al., Block Independent Component Analysis for Face Recognition, In Proc. 14th International Conference on Image Analysis and Processing, pp. 217-222 (2007).

Mika Inki, International Search Report for corresponding International Application No. PCT/FI2010/050765, p. 1, Feb. 3, 2011.

Pekka Laihanen, Finnish Search Report for corresponding Finnish Application No. 20096046, pp. 1-2, Jul. 16, 2010.

Pereira, et al., "Video-Based Face Verification with Local Binary Patterns and SVM Using GMM Supervectors," Computational Science and Its Applications ICCSA 2012, pp. 240-252, Jun. 18, 2012.

Tan, et al., "Face Recognition Based on a Single Image and Local Binery Pattern," IITA 2008, pp. 366-370, Dec. 20, 2008.

Ahonen, et al., "Face Recognition with Local Binary Patterns," Computer Vision—ECCV, pp. 469-481, Apr. 22, 2004.

Supplementary European Search Report, European Application No. EP 10 82 1621, 2 pages, Mar. 18, 2013.

Chinese Office Action with English Translation issued Jun. 19, 2013 in corresponding Application No. 201080048190.4.

* cited by examiner

FACE RECOGNITION IN DIGITAL IMAGES BY APPLYING A SELECTED SET OF COEFFICIENTS FROM A DECORRELATED LOCAL BINARY PATTERN MATRIX

FIELD

The invention relates generally to face recognition in a digital image.

BACKGROUND

Face detection is a demanding task for many reasons. In addition to actual face detection, that is, detecting that there is a face is in the image, one may want to identify the face so as to link the identified face to a specific identity (a specific person). Such a face recognition is used in a wide variety of applications including security systems, biometric detection, authentication, generation of metadata from a plurality of images and measuring the similarity of faces, to mention only a few.

Face recognition can be seen as a specific case of object detection. However, face recognition is significantly more challenging than simple object detection because the characteristics of a face are more detailed than the characteristics of a simple object, such as a cubic box, for example. Further, the appearance of face changes in time and is also deformable in shape, and is thus more challenging to identify than manmade objects. Neighboring pixels have therefore different dependency on each other than in general object detection. Further, general object detection does not require the interpretation of the identity of the object.

In face recognition facial features are typically extracted from the image and compared to a predetermined feature database. Current face recognition technologies apply, for example, local binary patterns (LBP), where information is obtained by comparing one location of an image (one pixel) to one neighboring pixel. This approach as such has disadvantages related to lack of discriminating facial features leading to poor accuracy and poor consideration of a local structure of neighboring pixels. In addition, different approaches than LBP, namely a local phase quantization (LPQ) technique or a decorrelated LPQ technique has been adopted to face recognition. However, these solutions for performing face recognition include also several disadvantages related to, for example, excessive amount of features and data leading to slow processing compared to LBP. Moreover, the use of LPQ does not provide as accurate results as the use of LBP. Further, these solutions as such have problems with uneven illumination of the face and varying viewpoint towards the face, for example.

Accordingly, a novel solution for performing face recognition is needed.

BRIEF DESCRIPTION OF THE INVENTION

Embodiments of the invention aim at providing an improved solution for face recognition.

According to an aspect of the invention, there is provided a method as specified in claim 12.

According to an aspect of the invention, there is provided an apparatus as specified in claim 22.

According to an aspect of the invention, there is provided a computer program product as specified in claim 24.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Face recognition is typically processed in apparatuses with high processing capabilities, such as computers. However, nowadays customer requirements for digital cameras and mobile phones are increasing and, thus, it is desired that face recognition technology can also be applied in apparatuses with limited processing capabilities, such as mobile phones. The solution for face recognition according to an embodiment may be applied in apparatuses with low processing capabilities.

Figure 1:
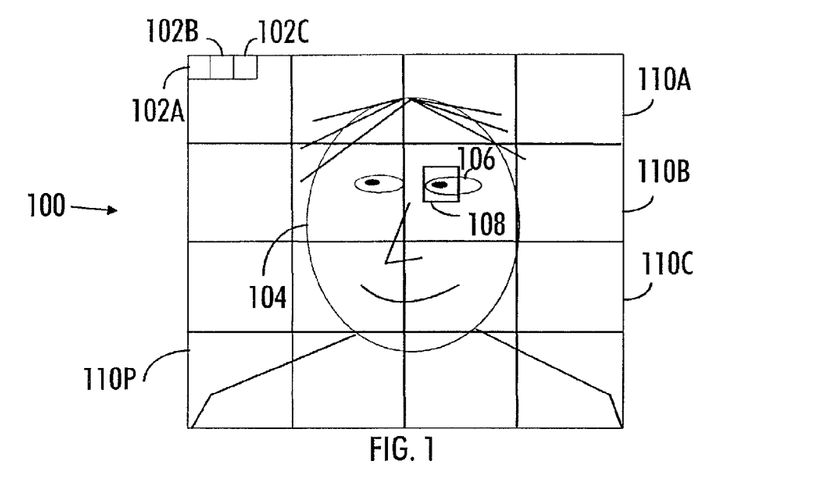
FIG. 1 illustrates an exemplary digital image.

FIG. 1 illustrates a digital image 100. The image may be constructed of multiple pixels 102A to 102C (from now on referred to as 102). The digital image 100 may comprise thousands of pixels 102. For example, the digital image 100 may be constructed of 1920×1080 pixels, as is the case in state-of-the-art high-definition images, where the values refer to the number of the pixels 102 in horizontal and vertical directions, respectively. In other words, the number of pixels 102 in the digital image 100 may determine the resolution of the digital image 100. The higher the number of pixels 102 is, the more accurate resolution the digital image 100 has.

The digital image 100 may further contain an object, such as a human face. The object may naturally also be other than a human face. That is, the object may be any object that is visible from the digital image 100. For reasons of clarity, let us assume that the object in the image is a face 104.

According to an embodiment, the face 104 of a person is recognized from the digital image 100 constructed of multiple pixels 102. The recognition denotes that the identity of the person can be found or verified out on the basis of the person's face 104. This information may be used in several applications including security systems.

Further, the face 104 may be detected from the digital image 100 by using any appropriate object detection techniques available. The face 104 may comprise certain facial features 106. An exemplary facial feature 106 may be an eye, nose, mouth, ear, hair, space between the eyes, etc. In general, the facial feature 106 may be any pixel combination that represents the feature of the face 104. That is, the facial feature 106 may not be any concrete part of the face 104, such as an eye, but the facial feature 106 may exist if certain pixels have certain characteristics. These characteristics may be learned prior to the face recognition process.

The facial feature 106 may be located at a specific location of the face 104. For example, if the facial feature 106 to be detected is the eye, then the facial feature 106 may be surrounding a pixel 108. Further, an observation area of the face and the resolution of the image may be determined on the basis of the size of the face to be detected.

According to an embodiment, the image 100 is divided into at least one sub-block 110A to 110P. The FIG. 1 shows an exemplary division of the digital image 100 into sub-blocks 110A to 110P (from now on referred to as 110). Each sub-block 110 may be processed separately in the face recognition process, as will be described. The sub-blocks 110 may not be in equal size although so shown in FIG. 1. One sub-block 110A may be larger than the sub-block 1108. Moreover, the form of the sub-blocks 110 may be chosen independently. That is, one sub-block 110A may be of a rectangular form and another sub-block 1108 may be of another form, such as an oval, a triangle, a circle, etc. Moreover, the sub-blocks 110 may contain pixels 102 that are not located in the same physical entity. In other words, the sub-blocks 1108 and 110P could be configured as a single sub-block instead of two separate sub-blocks even though the pixels 102 of the sub-blocks 1108 and 110P are not located next to each other in the image 100. The division of the sub-block may vary according to where the face is located in an image such that each of the sub-blocks comprises certain part(s) of the face.

In practice the division into sub-block 110 may be performed for a normalized image in which the face of the image is fixed in certain position. This way, each of the sub-blocks comprises certain known part(s) of the face.

The number of the sub-blocks 110 may be a hundred, for example, so that the image 100 is divided into 10 times 10 sub-blocks 110 in horizontal and vertical direction, respectively. However, it is also possible that there is only one sub-block 110, in which case the image 100 is itself a sub-block 110.

The image 100 may be converted into a grayscale image. In the grayscale image, the value of each pixel is a single sample representing information about the intensity of the pixel. Grayscale images are composed of multiple shades of gray, varying from black at the weakest intensity to white at the strongest. However, according to an embodiment of the invention, the image may not need to be converted into the grayscale prior to face recognition. The face recognition may be performed on a colored digital image as well, or color channels may be combined by some other means to derive one or more different representations of image contents.

Figure 2A:
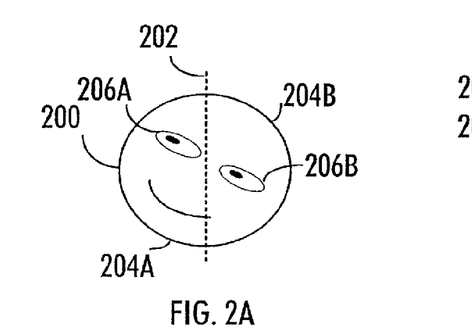
FIGS. 2A and 2B show a normalization of a face image according to an embodiment of the invention.
Figure 2B:
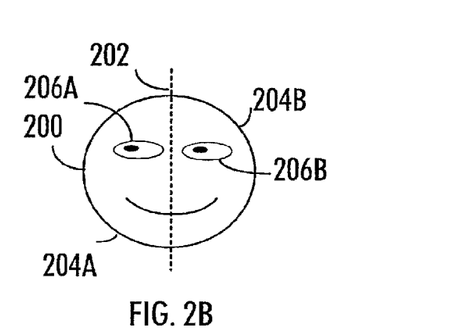
Figure 3A:
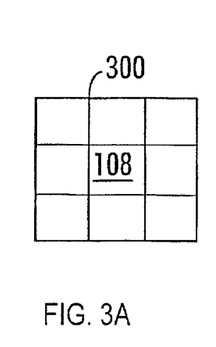
FIGS. 3A to 3D show exemplary neighborhood formations.
Figure 3B:
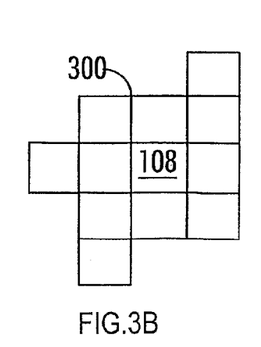
Figure 3C:
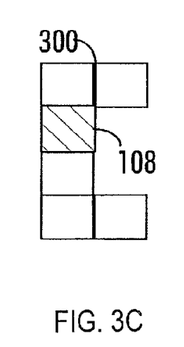
Figure 3D:
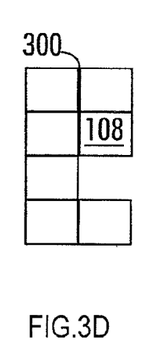

FIG. 2 shows a normalization of the face image according to an embodiment of the invention. It is clear that a face 200 in the image may not always be symmetrical with respect to the center line 202 of the face 200. In other words, the alignment, inclination and position of the face 200 in the image may vary between different images.

The input to a face recognition process may be an image where a face is detected, i.e., it has been determined that the object in the image is a face. The input may be as shown in FIG. 2A. FIG. 2A shows an original face image where the face 200 is inclined with respect to the center line 202. For this reason, the face half 204A is not symmetrical to face half 204B.

According to an embodiment, at least one facial characteristic 206A and 206B, such as an eye, is detected from the image and the position of the at least one facial characteristic 206A and 206B is adjusted to a predetermined location. This is shown in FIG. 2B, where the eyes 206A and 206B are adjusted in a predetermined location in the image. The predetermined location may be determined with at least one pixel. In other words, the adjustment fixes the typical features of the face 200 into a certain location in the image coordination. The aim is to provide as uniform images as possible without distorting the features that distinguish a face from another face. Further, by performing the adjustment the size of a certain face is the same regardless of what was the size and location of the face in the original image.

In an embodiment, the eyes 206A and 206B are fixed to a predetermined position by first determining a rough vertical center point from the face image. The vertical center point limits the location of the eyes 206A and 206B. The vertical center point of the image may be determined by observing the upper part of the face in the original (inclined) face image. As explained earlier the pixels of the image may be represented with intensity values. Accordingly, an average and a standard deviation of the intensity values of the pixels in the area under observation are determined and based on the determination results the rough vertical center point is obtained. This is because typically the average intensity is high in the area of the nose, whereas the standard deviation is low. In other words, the lighting is even in the area of nose. In other parts of the face, the lighting is more uneven. The nose implicitly indicates the rough vertical center point.

After the rough vertical center has been obtained, the eyes 206A and 206B are searched for. If there are multiple pixels where an eye 206A or 206B is located, the average value of them is taken. This is because an eye typically comprises multiple image pixels.

Next, after the eyes 206A and 206B are detected, the eyes 206A and 206B are moved to predetermined positions. Naturally, the rest of the facial characteristics such as lips, nose, ears, etc. are moved as well. The movement (adjustment) is performed by interpolating the original pixels into the target coordination in which the eyes 206A and 206B are in the predetermined positions. The size of the target coordination may be selected. It may be 150 times 130 pixels, for example. The resulting face is shown in FIG. 2B.

According to an embodiment, the normalization procedure further comprises manipulating at least one pixel value of the at least one sub-block so as to generate at least one lighting insensitive pixel value. This can be done by any known technique for generating lighting insensitive pixels. As said, the normalization can be done separately for each sub-block 110 of the image 100, as in FIG. 1.

According to an embodiment, the normalization procedure further comprises matching one half 204A of the detected face 200 to the other half 204B by applying symmetrical characteristics of the face 200. In practice, one half 204A of the detected face 200 is matched to the other half 204B. This may denote adjusting the location of ears, the horizontal alignment of the lips, etc. This enables a more detailed position adjustment compared to the discussed eye 206A, 206B adjustment alone by obtaining knowledge on whether one half 204A of the detected face 200 is higher than the other half 204B, or whether the center line 202 is moved, etc.

Moreover, the known facial characteristics can be searched for in the image from predefined locations, that is, from locations where the facial characteristics are assumed to be. The location information of the facial characteristics allows the image to be even further normalized by taking into account the 3-dimensional characteristics of the face 200.

An advantage of the sequential normalization is that an accurate face image is obtained with limited amount of calculations. By predicting the location of the at least one facial characteristic, such as the eyes 206A and 206B, the area to be searched for is significantly decreased in size compared to the whole image, which leads to a fast and accurate search.

Referring to FIG. 3, a neighborhood 300 for each pixel 108 under observation in the at least one sub-block may be selected, the neighborhood 300 being of a known size and form. FIG. 3 illustrates different forms of the neighborhood 300. In FIG. 3A, the neighborhood 300 is comprised of nine pixels, that is, the pixel 108 under observation has eight neighbors. In other words, the size of the neighborhood is eight pixels. The neighborhood 300 in FIG. 3A is relatively regular and commonly seen in image processing. However, according to an embodiment of the invention, the neighborhood 300 does not need to be of a regular size. That is, the neighborhood 300 may be of an arbitrary size and form. This is shown with FIGS. 3B to 3D, in which the neighborhood 300 has many exemplary forms and sizes. Common to all the neighborhoods 300 illustrated in FIGS. 3A to 3D is that they represent a neighborhood for the pixel 108 under observation. The pixel 108 may not need to be comprised in the neighborhood 300, as shown in FIG. 3C with leftwards slanting diagonal lines. In general, the size or the form of the neighborhood 300 is not limited in any way, and it may be selected according to what kind of facial feature is searched for. Also, it may be learnt prior to the face recognition process.

Each of the pixels in the neighborhood 300 may have one value representing information about the intensity of the pixel. In other words, the pixel value may be comprised of a single sample representing the intensity value of the pixel. The pixel value may a scalar representing the intensity of the pixel. The pixel values of each neighborhood 300 may be read by a reading apparatus or the like. The reading may take place from a data record or from the file of the image. Alternatively, the pixel values may be read by visually examining the image provided that the reading apparatus is equipped with a sensor capable of visually examining the image.

According to an embodiment, at least one set of coefficients is selected from a decorrelated local binary pattern (LBP) matrix, the at least one set of coefficients being for weighting the pixel values of the neighborhood. The coefficients are applied such that each pixel value of the neighborhood is weighted with at least one coefficient. That is, the number of pixels in the neighborhood G and the number of coefficients in the set of coefficients A=$[a_1, a_2, \ldots, a_n]$, where n is the amount of pixels in the neighborhood G, may be the same. Similarly, the pixel values of the neighborhood G may be given as $[g_1, g_2, \ldots, g_n]$.

The selection of the at least one set of coefficients may be conducted such that the local structure of the neighborhood is taken into account, not only the size and form of the neighborhood but also the pixel values of the neighborhood. That is, in addition to selecting the size and form of the neighborhood according to the size and form of the feature to be searched for, the coefficient $a_1$ may be selected such that it takes the corresponding $g_1$, and the neighboring pixel values $[g_2, \ldots, g_n]$, into consideration. That is, the coefficients A may be selected such that the set of coefficients A enhances a certain feature. Typically each set of coefficients A indicates a certain shape or a certain frequency band within the neighborhood. The coefficients $[a_1, a_2, \ldots, a_n]$ may look arbitrary, but chosen properly, the combination of $[a_1, a_2, \ldots, a_n]$ can form a powerful descriptor. An advantage of local information is that it is robust and insensitive to the variations of luminance to the face.

According to an embodiment, the at least one set of coefficients $[A_1, A_2, \ldots, A_m]$ is selected from the decorrelated LBP matrix. In the local binary pattern technique, a value for the pixel under observation is compared to all the neighboring pixel values and the comparison results are applied as columns or rows in a matrix to form a matrix. Consequently, the values for a set of coefficients are limited to only a few possible values and are mainly zeros, that is, they are of the form [1 0 0 0 0 0 0 0 −1], [0 1 0 0 0 0 0 0 −1], etc.

Here the neighborhood for which the LBP is applied, is not fixed but it can vary as explained above with regards to FIG. 3. In LBP a neighborhood of size three times three is typically used. However, here the neighborhood is not necessarily fixed to three times three neighborhood but the size and form of the neighborhood may be predetermined. For example, the form may be as in FIGS. 3B to 3D. Further, the distance of the selected neighboring pixels from the pixel 108 may vary. That is, the neighboring pixels may not have to be the adjacent pixels to the pixel 108.

Since the neighboring pixels typically depend on each other, the resulting sets of coefficients may be highly dependent on each other. As a result, the sets of coefficients from the LBP matrix as such may not provide a sufficient amount of information for performing a reliable search of a facial feature.

Thus, according to an embodiment of the invention, in the case of multiple sets of coefficients, the sets of coefficients may be decorrelated. That is, the sets of coefficients may be independent of each other. This way, each one of the sets of coefficients $[A_1, A_2, \ldots, A_m]$ may take the whole neighborhood into account by reducing the number of zero-coefficients in the sets of coefficients. This leads to finding more discriminating facial features from the image. In other words, using independent sets of coefficients may enable a more accurate recognition of a face with the same number of facial features as in prior art solutions or, alternatively, the same recognition accuracy of a face with a fewer number of facial features as in prior art solutions. For example, the at least one facial feature with the least amount of useful information, obtained with the decorrelated (independent) sets of coefficients A, may be discarded from the set of applied facial features, thus saving memory capacity and speeding up the face recognition process.

In order to obtain independent sets of coefficients $[A_1, A_2, \ldots, A_m]$, the LBP matrix may be whitened in order to obtain de-correlated matrix elements. As explained earlier, the local binary pattern may produce sets of coefficients, which are simple and dependent of each other and, thus, may not provide a sufficient amount of data for recognizing the face effectively and accurately. By whitening the matrix, the sets of coefficients may be made independent (decorrelated) of each other. Consequently, the at least one set of coefficients may be selected from the whitened matrix. The selected at least one set of coefficients may be applied in the face recognition by weighting the neighborhood. However, the matrix to be whitened may also be obtained by other means than the local binary pattern technique. For example, the matrix may be learnt prior to the face recognition process such that the matrix may enhance a certain facial feature(s).

A similar method to the local binary pattern, the modified census transform, compares the pixel values in the neighborhood with the average pixel value of the neighborhood. This results in nine comparison results in the case of a neighborhood of size three times three. By whitening the matrix of comparison results including the nine bits, the same information may be captured with fewer bits, thus saving capacity.

According to an embodiment, the LBP matrix may be whitened (decorrelated) by applying the Markov model to the matrix. According to the Markov model, the dependency between the pixel values is related to their mutual distances.

Alternatively, according to another embodiment, the LBP matrix may be decorrelated by applying decorrelating coefficients, wherein the decorrelating coefficients for each of the at least one sub-block are learnt on the basis of analyzing a plurality of images representing faces. That is, the decorrelating coefficients may be determined by applying knowledge on the dependency of the pixel values G inside the neighborhood obtained from specific face images or image models. For example, the dependency between the pixel values in a specific area may be determined and, based on that knowledge, the decorrelating coefficients may be generated. For example, the dependency between the pixel values in the nose area may be determined by analyzing several images comprising a nose. Once the dependency is known, any known technique to decorrelate a known dependency (correlation) may be used to generate the decorrelating coefficients. The decorrelating coefficients are then used to weight the LBP matrix so as to generate independent, decorrelated LBP matrix elements. The dependency between the pixel values may also be determined for distant pixels, not only to the pixels next to each other. Further, the dependency between the pixel values may be determined for several pixels, not only between two pixels. The decorrelating coefficients may be independent for each sub-block 110 of FIG. 1. The decorrelating coefficients may have been learned for each sub-block separately. For instance, the decorrelating coefficients for the sub-block comprising a nose may be different than the decorrelating coefficients corresponding to a sub-block comprising a forehead, a chin, ears, etc. In an embodiment, the information regarding the dependency of the pixel values in a certain sub-block of a plurality of face images can be applied in determining the decorrelating coefficients for that sub-block.

The learning may be accomplished such that the determination of the decorrelating coefficients is performed for a number of digital images with a face, and for a number of resolutions of each digital image. For example, the image containing the same face may be processed several times with different resolutions and under the influence of different environmental characteristics, such as illumination. This way, the decorrelating coefficients may be determined for different resolutions and for images under the influence of different environmental characteristics.

Figure 4A:
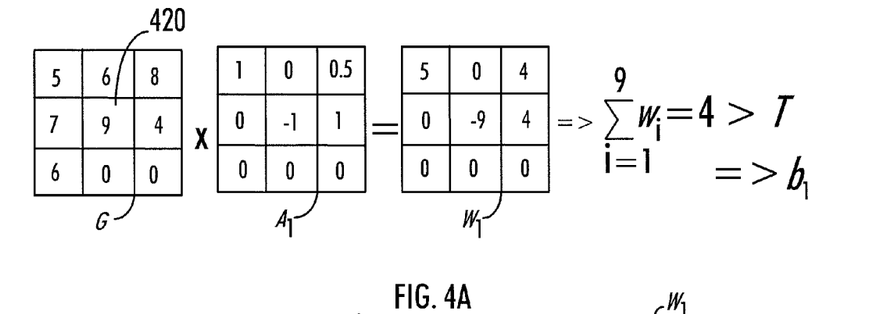
FIG. 4A illustrates a combination of the weighted pixel values, according to an embodiment of the invention.

According to an embodiment, a feature value for each pixel under observation is determined on the basis of at least one combination of weighted pixel values of the neighborhood. Let us imagine that the neighborhood G comprises nine pixels in a three times three formation, the first set of coefficients $A_1=[a_{1,1}, a_{1,2}, \ldots, a_{1,9}]=[1\ 0\ 0.5\ 0\text{-}1\ 1\ 0\ 0\ 0]$ and the pixel values for G are given as $[g_1, g_2, \ldots, g_9]=[5\ 6\ 8\ 7\ 9\ 4\ 6\ 0\ 0]$. FIG. 4A illustrates $A_1$, G and how the combination of the weighted pixel values is performed. As can be seen from FIG. 4A, the pixel values of G may be multiplied by $A_1$ in order to obtain the weighted pixel values $W_1=[w_{1,1}, w_{1,2}, \ldots, w_{1,9}]$. Further, the combination of the weighted pixel values $W_1=[w_{1,1}, w_{1,2}, \ldots, w_{1,9}]$ may be a sum of the weighted pixel values $W_1=[w_{1,1}, w_{1,2}, \ldots, w_{1,9}]$. However, the combination of the weighted pixel values $W_1=[w_{1,1}, w_{1,2}, \ldots, w_{1,9}]$ is not limited to summing, that is to $$\sum_{i=1}^{n} w_{1,i},$$

but the combination may be any arithmetic operation of the weighted pixel values $W_1=[w_{1,1}, w_{1,2}, \ldots, w_{1,9}]$.

According to an embodiment of the invention, a comparison result between a predetermined threshold T and the combination of the weighted pixel values is determined in order to obtain at least one information bit b for each pixel under observation, the at least one information bit b representing an existence of a specific facial feature at the pixel under observation, as shown in FIG. 4A. The pixel under observation may, in this example, be the center pixel 420 in the neighborhood G. For example, when the result of the combination of the weighted pixel values is higher than the threshold T, the value for the first information bit $b_1$ may be 1. Similarly, when the result of the combination of the weighted pixel values is equal to or lower than the first threshold T, the value for the first information bit $b_1$ may be 0. The threshold T may represent a threshold for the intensity and it may be determined prior to the face recognition, for example by learning.

Thus, each neighborhood G may provide one information bit for each set of coefficients. Applying multiple sets of coefficients $[A_1, A_2, \ldots, A_m]$ may provide multiple information bits for the same neighborhood (for the same pixel 420 under observation), that is, a vector B of information bits $[b_1, b_2, \ldots, b_m]$. One set of coefficients may be used in the search for one facial feature. Another set of coefficients may be selected to aid in the search for another facial feature or in the search of the same facial feature under the influence of different environmental characteristics, such as luminance.

Figure 4B:
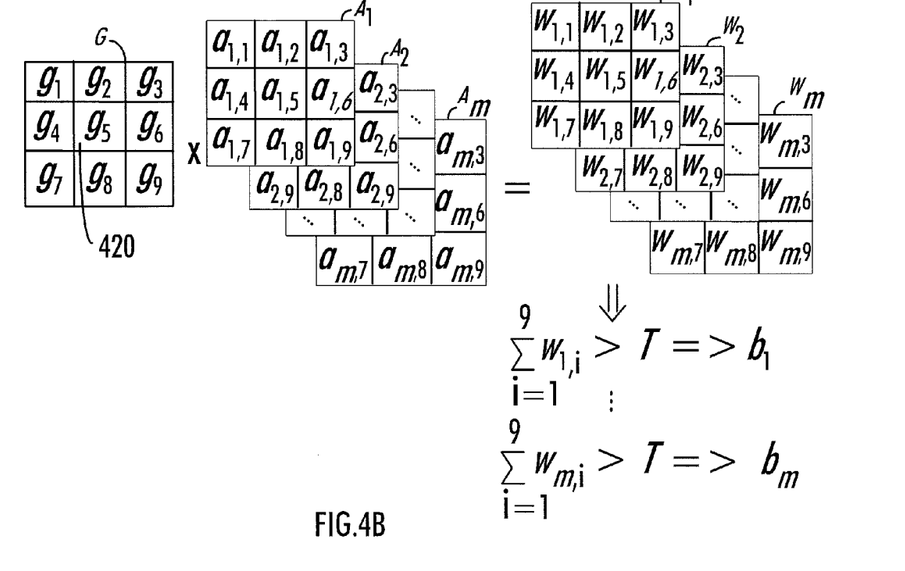
FIG. 4B illustrates a combination of the weighted pixel values, according to an embodiment of the invention.

This is illustrated in FIG. 4B, where the neighborhood G is weighted by multiplying G by multiple sets of coefficients $[A_1, A_2, \ldots, A_m]$ resulting in multiple sets of weighted pixel values $[W_1, W_2, \ldots, W_m]$. Each $A_i$ will be comprised of a three times three matrix including coefficients $[a_{i,1}, a_{i,2}, \ldots, a_{i,9}]$. Similar notations apply to the weighted sets of coefficients $W_i$. As explained earlier, the size or form of the neighborhood is not limited to three times three neighborhood but any size and form may be selected. Consequently, the size and form of the matrix of coefficients A follow the size and form of the neighborhood. Each combination of the sets of weighted coefficients may be compared to the threshold T. Each comparison result may provide one information bit b representing existence of a specific facial feature at the pixel 420 under observation, as shown in FIG. 4B. In other words, the binary representation for the neighborhood and, thus, for the pixel under observation may be provided with multiple binary values. For example, if the number of sets of coefficients is m, then the vector B of information bits equals $[b_1, b_2, \ldots, b_m]$. In other words, m bits of information may be provided for the neighborhood G of the pixel under observation. Thus, if m=8, G may be represented with $2^8=256$ different binary combinations. Each binary combination represents different structures of the neighborhood of the pixel under observation and different facial features located in the neighborhood of the pixel under observation. A binary combination of $[1\ 1\ 0\ 0\ 1\ 0\ 1\ 1]_2$ equals to $203_{10}$ in decimal value, for example. This value can be considered as the feature value for the pixel under observation.

The threshold T may be learnt prior to the face recognition. For example, given a specific image with a face, the threshold T may be determined such that when comparing the threshold T and the combination of the weighted pixel values, the comparison result outputs a reliable result representing the existence of a certain facial feature in the image.

In general, well-known learning algorithms, such as the AdaBoost algorithm, may be applied in determining the most appropriate values for all the parameters that may need to be predetermined prior to the face recognition.

By applying the decorrelated sets of coefficients $[A_1, A_2, \ldots, A_m]$ (obtained by applying the Markov model or coefficients obtained through learning to the LBP matrix), the accuracy is improved compared to a use of correlated coefficients. Further, the flexibility of the solution is improved. In other words the number of calculated combinations of weighted pixel values can be decreased without having to make compromises with the accuracy of the face recognition. This may be done by dropping, for example, one combination such that instead of performing eight combinations as described above, only seven combinations are done. The dropped combination may be the one that would provide the least significant information bit $b_8$. Consequently, the required amount of data is reduced to half, that is, from $2^8=256$ to $2^7=128$ possible combinations, while each pixel in the neighborhood may still affect to the feature value for the pixel under observation. Nevertheless, the obtained seven information bits combination may be compared to the whole eight bits combination without significant distortions in the accuracy. According to an embodiment, the learning process for the parameters that may need to be obtained prior the face recognition is performed with full accuracy whereas the actual face recognition is performed with a fewer amount of information bits.

Thus, according to an embodiment such a number of sets of coefficients $[A_1, A_2, \ldots, A_m]$ may be applied which is smaller than the number of neighboring pixels in the selected neighborhood for the pixel under observation. For example, in FIG. 3A the pixel under observation 108 has eight neighbors. According to the embodiment, seven or fewer sets of coefficients are used for determining the information bits b.

As a result, at least one feature value is obtained for each pixel under observation. According to an embodiment, information on face similarity is obtained by comparing the determined at least one feature value to feature values corresponding to at least one face. That is, in the simplest form, the determined at least one feature value is compared to feature values of another face in another image. A certain facial feature may be compared to the corresponding facial feature of the comparison face, or the facial features (represented by the feature values) may be compared all at once. This provides information on how similar the faces are. In this embodiment, the actual identity of the person in the image is not necessarily revealed.

In another embodiment, the identity of the person in the image is determined by comparing the determined at least one feature value to a predetermined database of feature values corresponding to at least one identity. That is, a predetermined database comprising information on feature values of at least one identity is applied. The identities in the database may be known and the comparison result may reveal if the face in the image under face recognition process belongs to one of the identities in the database. The decision may be obtained by using a predetermined threshold with a predetermined error margin. The comparison of the determined at least one feature value to the predetermined database of feature values may be performed separately for each of the identities in the database, or a parallel comparison may be conducted.

Further, according to another embodiment, a histogram is generated from the feature values. The histogram may contain values between 0 and 256 (if eight sets of coefficients A are used). The values of the histogram may, thus, represent at least one facial feature. The histogram of feature values may be built separately for each of the at least one sub-block. That is, the face recognition process may be done separately for each sub-block of the image as explained above. The generated one or more histograms for the sub-blocks may be concatenated and information on face similarity or the identity of a person in the image may be obtained by comparing the concatenated histogram to a histogram of feature values corresponding to at least one face. The similarity of the histograms may be determined by using Euclidian distance between the histograms, the Chi-square distance, the amount of mutual information, an intersection distance, etc.

Further, according to an embodiment the determination of the face similarity is performed by applying different artificially modified versions of the image. The different versions of the image may denote different image resolutions, use of masks for manipulating the image before the actual face recognition process, filtering the image with different low-pass filters, for example, before the face recognition process, etc. As a result, the reliability of the face recognition may be improved. The filtering improves the recognition of faces in blurred images. By applying different versions of the image for the face recognition, a more discriminating description of the facial features is obtained.

Further according to an embodiment, the reliability of the face recognition may be further improved by determining of the face similarity for a sequence of digital images. This way, images of the same face can be obtained in different versions (different luminance, shooting angle, etc.) and the face recognition process may be performed for each of the images. To obtain the result of the face recognition, the individual results of each of the face recognitions performed for the sequence of digital images may be utilized. To speed up the process of sequential face recognition, only the spatial locations close to the previous detections need to be searched for in order to find the face to be recognized in each image.

Figure 5:
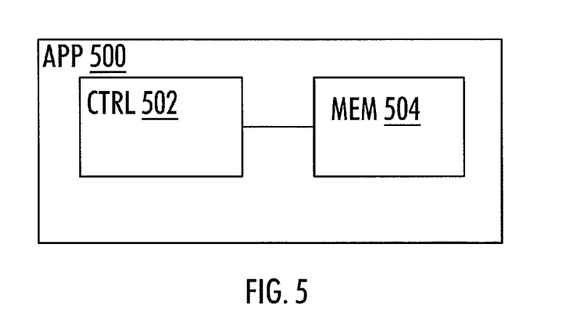
FIG. 5 illustrates a face recognition apparatus according to an embodiment of the invention.

A very general architecture of a face recognition apparatus 500 according to an embodiment of the invention is shown in FIG. 5. FIG. 5 only shows the elements and functional entities required for understanding the face recognition according to an embodiment of the invention. Other components have been omitted for reasons of simplicity. The implementation of the elements and functional entities may vary from that shown in FIG. 5. The connections shown in FIG. 5 are logical connections, and the actual physical connections may be different. It is apparent to a person skilled in the art that the face recognition apparatus 500 may also comprise other functions and structures.

The apparatus 500 for recognizing a face and obtaining similarity of the face compared to another face may comprise a processor 502. The processor 502 may be implemented with a separate digital signal processor provided with suitable software embedded on a computer readable medium, or with a separate logic circuit, such as an application-specific integrated circuit (ASIC). The processor 502 may comprise an interface, such as a computer port, for providing communication capabilities.

Further, the apparatus 500 may comprise a memory 504 for storing predetermined parameters, combination results, histograms, etc. However, the memory may also be integrated into the processor 502 and, thus, the memory 504 may not be required.

The processor 502 may be configured to perform the functionalities related to FIGS. 1 to 4 and 6.

According to an embodiment, the processor 502 is comprised in a mobile phone, or in another apparatus with limited computational resources.

Figure 6:
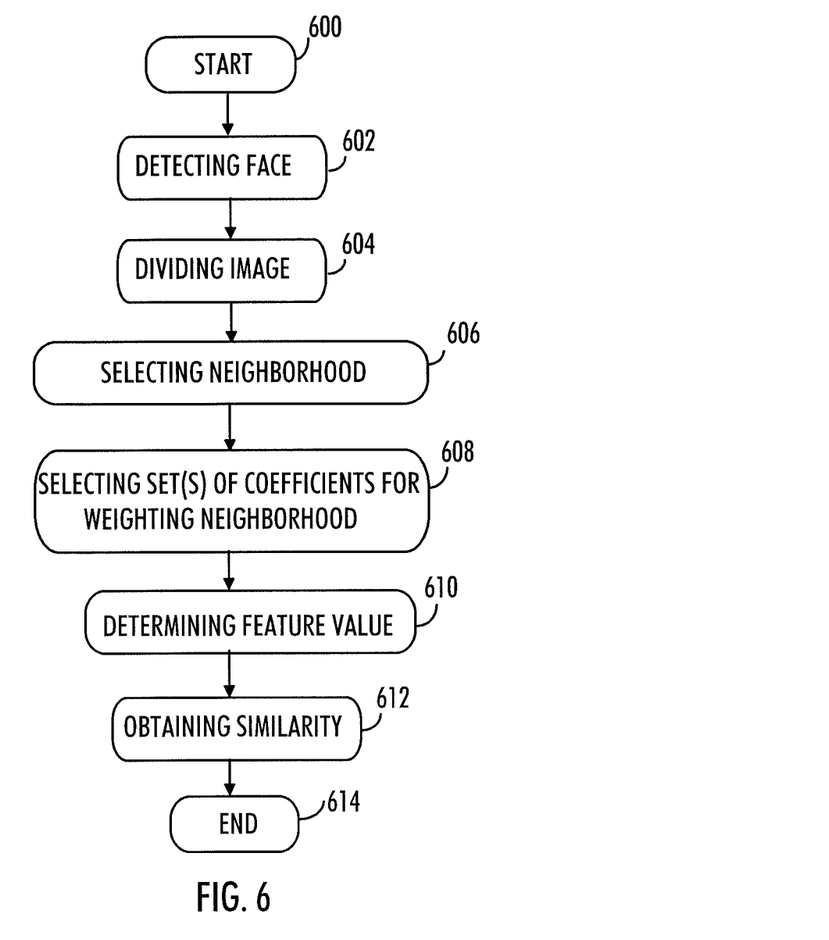
FIG. 6 shows a method for recognizing a face from a digital image.

FIG. 6 is a method for recognizing a face from a digital image. The method begins in step 600. In step 602, detecting the face from the digital image is performed. Step 604 comprises dividing the image into at least one sub-block. The number of the sub-blocks may be one or a hundred, for example. Next, in step 606, selecting a neighborhood for each pixel under observation in the at least one sub-block is performed, the neighborhood being of a known size and form. Step 608 comprises selecting at least one set of coefficients from a decorrelated local binary pattern matrix, the at least one set of coefficients being for weighting the pixel values of the neighborhood, and step 610 determines a feature value for each pixel under observation on the basis of at least one combination of weighted pixel values of the neighborhood. Finally, obtaining information on face similarity by comparing the determined at least one feature value to feature values corresponding to at least one face takes place in step 612. The method ends in step 614.

The techniques and methods described herein may be implemented by various means. For example, these techniques may be implemented in hardware (one or more devices), firmware (one or more devices), software (one or more modules), or combinations thereof. For a hardware implementation, the apparatus of FIG. 5 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of the systems described herein may be rearranged and/or complemented by additional components in order to facilitate the achieving of the various aspects, etc., described with regard thereto, and they are not limited to the precise configurations set forth in the given figures, as will be appreciated by one skilled in the art.

Thus, according to an embodiment, the apparatus for performing the tasks of FIGS. 1 to 4 and 6 comprises means for detecting a face from the digital image, means for dividing the image into at least one sub-block, and means for selecting a neighborhood for each pixel under observation in the at least one sub-block, the neighborhood being of a known size and form. Further, the apparatus comprises means for selecting at least one set of coefficients from a decorrelated local binary pattern matrix, the at least one set of coefficients being for weighting the pixel values of the neighborhood, means for determining a feature value for each pixel under observation on the basis of at least one combination of weighted pixel values of the neighborhood, and means for obtaining information on face similarity by comparing the determined at least one feature value to feature values corresponding to at least one face.

Embodiments of the invention may be implemented as computer programs in the apparatus of FIG. 5 according to the embodiments of the invention. The computer programs comprise instructions for executing a computer process for improving the face recognition. The computer program implemented in the apparatus may carry out, but is not limited to, the tasks related to FIGS. 1 to 4 and 6.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method for recognizing a face of a person from a digital image constructed of multiple pixels, comprising:
    detecting the face from the digital image;
    dividing the image into at least one sub-block;
    selecting a neighborhood of pixels for a pixel under observation in the at least one sub-block, the neighborhood being of a known size and form;
    decorrelating a local binary pattern matrix applicable to the neighborhood, wherein the decorrelation is done in order to obtain a decorrelated local binary pattern matrix comprising decorrelated matrix elements;
    selecting at least one set of coefficients from the decorrelated local binary pattern matrix, the at least one set of coefficients being for weighting values of the pixels in the neighborhood;
    determining a feature value for the pixel under observation on the basis of at least one combination of weighted pixel values of the neighborhood;
    obtaining information on face similarity by comparing the determined at least one feature value to feature values corresponding to at least one face; and
    generating one or more histograms of feature values separately for each of the at least one sub-block, concatenating the one or more histograms generated, and obtaining information on face similarity or determining the identity of the person in the image by comparing the one or more histograms generated to a histogram of feature values corresponding to at least one face.

2. The method of claim 1, further comprising at least one of the following:
    detecting at least one facial characteristic and adjusting the position of the at least one facial characteristic to a predetermined location, manipulating at least one pixel value of the at least one sub-block so as to generate at least one lighting insensitive pixel value, and matching one half of the detected face to the other half by applying symmetrical characteristics of the face.

3. The method of claim 1, further comprising:
    applying such a number of sets of coefficients which is less than a number of pixels neighboring the pixel under observation in the neighborhood selected for the pixel under observation.

4. The method of claim 1, further comprising:
    decorrelating the local binary pattern matrix by applying a Markov model.

5. The method of claim 1, further comprising:
    decorrelating the local binary pattern matrix by applying decorrelating coefficients, wherein the decorrelating coefficients for each of the at least one sub-block are learnt on the basis of analyzing a plurality of images representing faces.

6. The method of claim 1, further comprising:
performing a determination of the face similarity by applying different artificially modified versions of the digital image.

7. An apparatus for recognizing a face of a person from a digital image constructed of multiple pixels, comprising a processor configured to:
detect the face from the digital image;
divide the image into at least one sub-block;
select a neighborhood of pixels for a pixel under observation in the at least one sub-block, the neighborhood being of a known size and form;
decorrelate a local binary pattern matrix applicable to the neighborhood, wherein the decorrelation is done in order to obtain a decorrelated local binary pattern matrix comprising decorrelated matrix elements;
select at least one set of coefficients from the decorrelated local binary pattern matrix, the at least one set of coefficients being for weighting values of the pixels in the neighborhood;
determine a feature value for the pixel under observation on the basis of at least one combination of weighted pixel values of the neighborhood;
obtain information on face similarity by comparing the determined at least one feature value to feature values corresponding to at least one face; and
generate one or more histograms of feature values separately for each of the at least one sub-block, concatenate the one or more histograms generated, and obtain information on face similarity or determine an identity of the person in the image by comparing the one or more histograms to a histogram of feature values corresponding to at least one face.

8. The apparatus of claim 7, wherein the processor is comprised in a mobile phone.

9. A computer program product embodied on a non-transitory computer-readable storage medium and comprising a program code which, when run on a processor, executes a method for recognizing a face of a person from a digital image constructed of multiple pixels, comprising:
detecting the face from the digital image;
dividing the image into at least one sub-block;
selecting a neighborhood of pixels for a pixel under observation in the at least one sub-block, the neighborhood being of a known size and form;
decorrelating a local binary pattern matrix applicable to the neighborhood, wherein the decorrelation is done in order to obtain a decorrelated local binary pattern matrix comprising decorrelated matrix elements;
selecting at least one set of coefficients from the decorrelated local binary pattern matrix, the at least one set of coefficients being for weighting values of the pixels in the neighborhood;
determining a feature value for the pixel under observation on the basis of at least one combination of weighted pixel values of the neighborhood;
obtaining information on face similarity by comparing the determined at least one feature value to feature values corresponding to at least one face; and
generating one or more histograms of feature values separately for each of the at least one sub-block, concatenating the one or more histograms generated, and obtaining information on face similarity or determining an identity of the person in the image by comparing the one or more histograms to a histogram of feature values corresponding to at least one face.

* * * * *

UNITED STATES PATENT AND TRADEMARK OFFICE
CERTIFICATE OF CORRECTION

PATENT NO. : 8,582,836 B2  
APPLICATION NO. : 13/500035  
DATED : November 12, 2013  
INVENTOR(S) : Matti Niskanen et al.

Page 1 of 1

It is certified that error appears in the above-identified patent and that said Letters Patent is hereby corrected as shown below:

IN THE SPECIFICATION:

Column 3, Lines 17, 20, 23 and 25

Now reads:    "1108"  
    Should read:  "110B"

Signed and Sealed this  
Second Day of September, 2014

Michelle K. Lee  
*Deputy Director of the United States Patent and Trademark Office*